United States Patent [19]

Oshio et al.

[11] Patent Number: 5,067,054

[45] Date of Patent: Nov. 19, 1991

[54] BEAM-FORMING SHADE FOR VEHICULAR HEADLAMP

[75] Inventors: Hirohiko Oshio; Noboru Koike; Takasi Ochiai, all of Shizuoka, Japan

[73] Assignee: Koito Manufacturing Co., Ltd., Tokyo, Japan

[21] Appl. No.: 594,572

[22] Filed: Oct. 9, 1990

[30] Foreign Application Priority Data

Oct. 11, 1989 [JP] Japan ............................ 1-118283[U]
Aug. 31, 1990 [JP] Japan ............................ 2-228218

[51] Int. Cl.[5] ............................ B60Q 1/00

[52] U.S. Cl. ............................ 362/61; 362/346; 362/304; 313/113

[58] Field of Search ............................ 362/61, 80, 302, 304, 362/344, 346, 297, 298; 313/113, 114

[56] References Cited

U.S. PATENT DOCUMENTS

| | | | |
|---|---|---|---|
| 4,268,895 | 5/1981 | Yabata | 362/341 |
| 4,321,658 | 3/1982 | Deverrewaere | 362/344 |
| 4,344,119 | 8/1982 | Bergot | 362/307 |
| 4,882,660 | 11/1989 | Liverance et al. | 362/61 |
| 4,922,398 | 5/1990 | Muto | 362/346 |

*Primary Examiner*—Ira S. Lazarus
*Assistant Examiner*—D. M. Cox
*Attorney, Agent, or Firm*—Sughrue, Mion, Zinn, Macpeak & Seas

[57] ABSTRACT

A beam-forming shade for use in a vehicular headlamp comprising a cylindrical shade body disposed horizontally in surrounding relation to a bulb of the vehicular headlamp so as to interrupt some parts of light emitted from a light source and a connecting member extending downwardly from the shade body and having a single mounting hole to be attached to a reflector by a single screw. The shade of the present invention is obtained by bending a single thin metal plate which is previously cut to form a predetermined contour, which plate having a continuous developed form of the cylindrical shade body and the connecting member, thereby obtaining an integral shade.

13 Claims, 6 Drawing Sheets

BEAM-FORMING SHADE FOR VEHICULAR HEADLAMP

BACKGROUND OF THE INVENTION

1. Field of the Invention

The present invention relates to a beam-forming shade for use in a vehicular headlamp, and more particularly to a beam-forming shade of the type which is disposed at a predetermined position with respect to a position of a filament (light source) so as to interrupt light emitted from the filament toward regions of a reflector of the headlamp other than a parabolic reflection surface thereof, that is, to mainly direct the light from the filament only toward the parabolic reflection surface region of the reflector, thereby effectively distributing the light reflected by the reflector.

2. Related Art

Various kinds of shades have been known as disclosed in U.S. Pat. Nos. 4,268,895, 4,344,119 and 4,321,658. One conventional shade of the type as shown in FIG. 1 comprises a cylindrical shade body 2 and a frame-shaped connecting member 4 having a pair of mounting parts which are welded together to form an integral construction. Thin metal plates 3 and 5 for forming the cylindrical shade body 2 and the frame-shaped connecting member 4, respectively, are obtained in a developed form by cutting, as shown in FIGS. 2A and 2B, and then they are bent into respective predetermined shapes, and then are integrally welded together. The shade 2 thus assembled is connected to a reflector 6 by a pair of screws 8 through the pair of mounting parts. A bulb 1 is fitted to a rear apex portion of the reflector 6.

In the conventional shade described above, however, a residual thermal strain may exist in the welded portion since the shade body 2 and connecting member 4 are formed by welding into the integral construction. Thermal stresses, due to a difference between the temperature when the bulb is lit and when it is off, would repeatedly act on the welded portion, and also stresses due to vibrations repeatedly act on the welded portion, which suffers from a problem that the welded portion between the shade body and the connecting member may be subjected to fatigue failure. On the other hand, the welding step is indispensable to the manufacture of the shade and, therefore, time required for assembling the same must correspondingly be increased, thus arising another problem of increased cost. There is a further problem that because of the necessity of the welding operation applied to the portion between the shade body and the connecting member, defective products are produced at a considerable rate, thus worsening the yield. Moreover, as shown in FIG. 1, since the conventional shade 2 is provided with a bridge-like frame bridging toward the two mounting parts, the shade suffer from a difficulty that some parts of light beam reflected by the reflector 6 are obstructed by the bridge-like frame thereby influencing the required light beam distribution. Moreover, since the conventional shade 2 is provided with a pair of mounting parts, it requires two screws 8 for actually connecting to the reflector, which increases the manufacturing cost.

SUMMARY OF THE INVENTION

The present invention has been made in view of the above problems accompanying the conventional shade, and an object of the invention is to provide a beam-forming shade for use in a vehicular headlamp which is constituted by a single thin metal plate and which provides an excellent mechanical strength.

Another object of the invention is to provide a beam-forming shade capable of being connected to a reflector of the headlamp by merely one screw.

Still another object of the invention is to provide a beam-forming shade having a connecting member which does not obstruct the light beam emitted from the light source, thereby achieving an effective light beam distribution.

The above and other objects have been achieved by a provision of a beam-forming shade for use in a vehicular headlamp which, according to the invention, comprises a cylindrical shade body disposed horizontally in surrounding relation to a bulb of the vehicular headlamp so as to interrupt some parts of light emitted from a light source and a connecting member extending downwardly from the shade body and having a single mounting hole to be attached to a reflector by a single screw. The shade of the present invention is obtained by bending a single thin metal plate which is previously cut to form a predetermined contour, which plate has a continuous developed form of the cylindrical shade body and the connecting member, thereby obtaining an integral shade.

Since the beam-forming shade of the present invention comprising the cylindrical shade body and the connecting member is formed by bending the single thin metal plate as described above, it is superior in mechanical strength to a conventional shade having two members welded together. Moreover, since there is no welded portion between the shade body and the connecting member, residual strain due to welding is not produced, thus eliminating the possibility of fatigue failure due to the concentration of stresses. Further, since the shade body and the connecting member are not welded, the manufacture can easily be done merely by the bending operation. Moreover, since the connecting member of the invention is provided with the single mounting hole, merely one screw is required for connecting the shade to the reflector, resulting in reducing the manufacturing cost.

DESCRIPTION OF THE PREFERRED EMBODIMENTS

Preferred embodiments of the present invention will now be described in detail with reference to the accompanying drawings.

FIGS. 4 to 9 shows a first embodiment according to the invention.

Figure 3A:
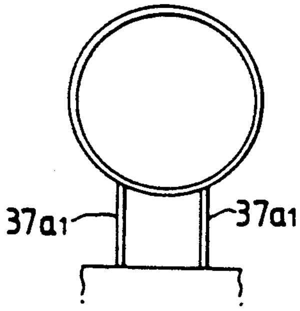
FIGS. 3A and 3B are views explanatory of a comparison between features of shade body-supporting portions.
Figure 3B:
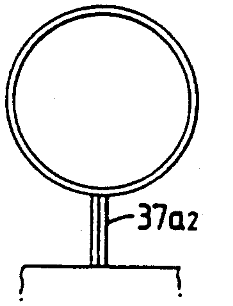
Figure 4:
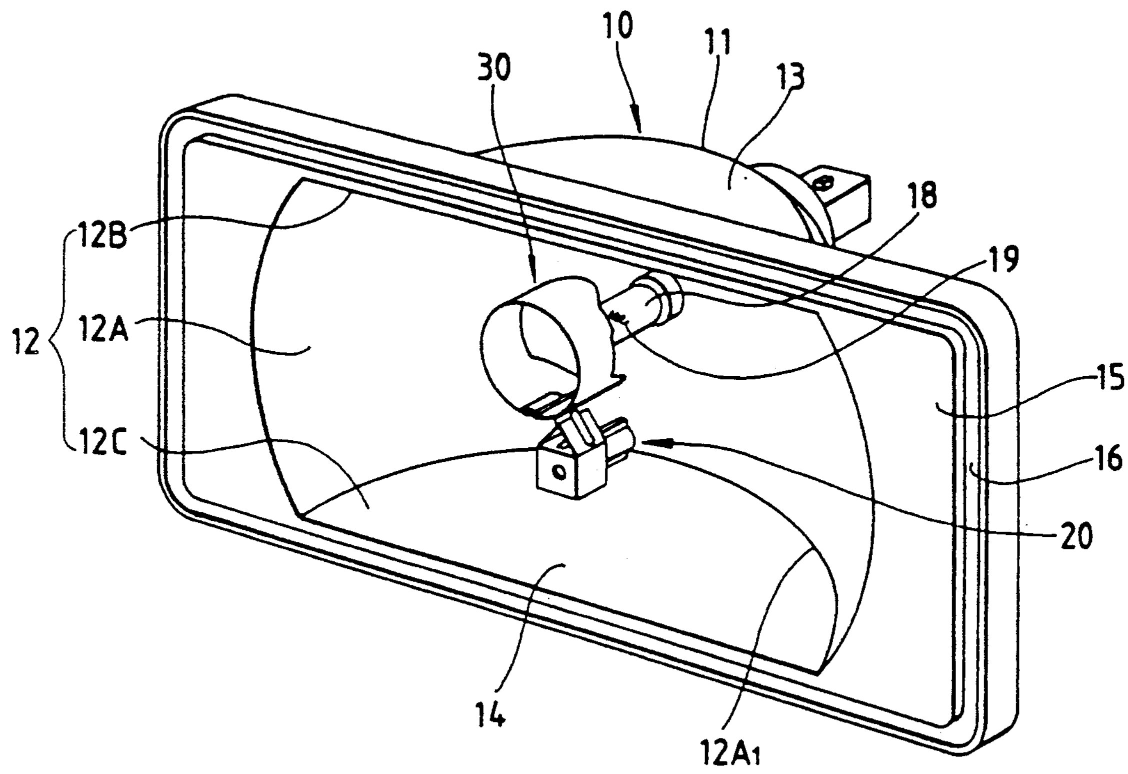
FIG. 4 is a perspective view of a headlamp incorporating a first embodiment of a shade of the present invention, with a lens removed.
Figure 5:
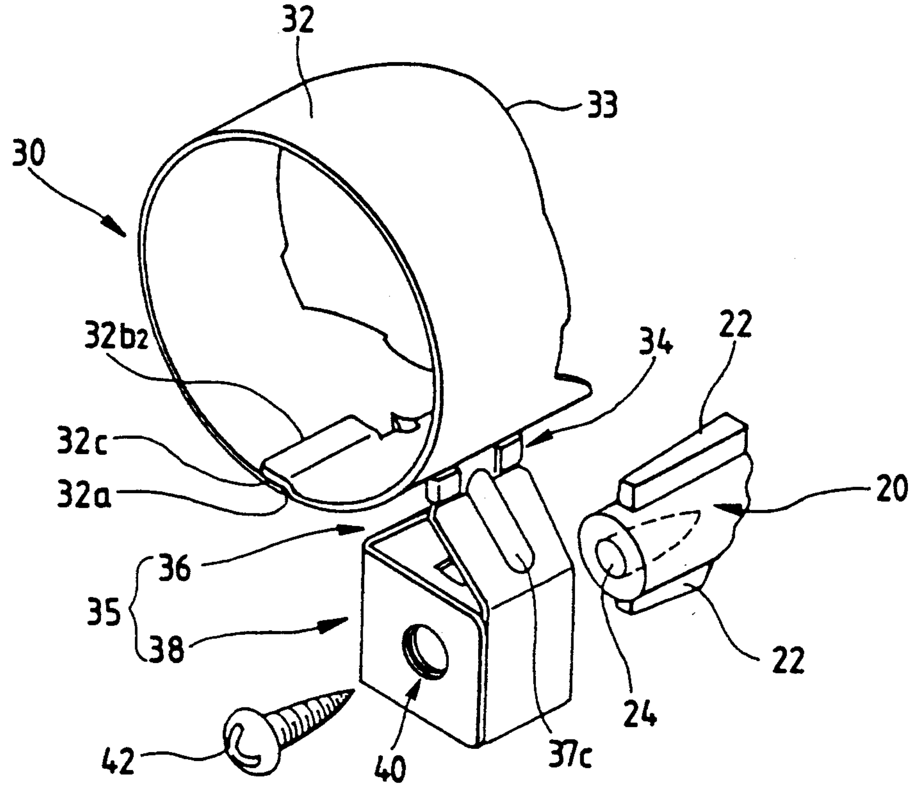
FIG. 5 is a perspective view of the shade shown in FIG. 4.
Figure 6:
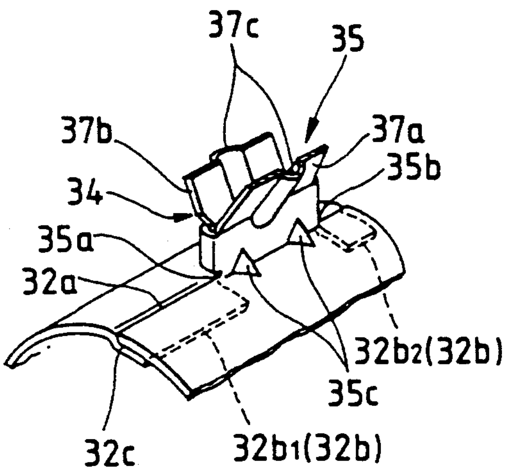
FIG. 6 is a perspective view as seen from the lower side, showing a portion of division between the shade body and a connecting member.
Figure 7:
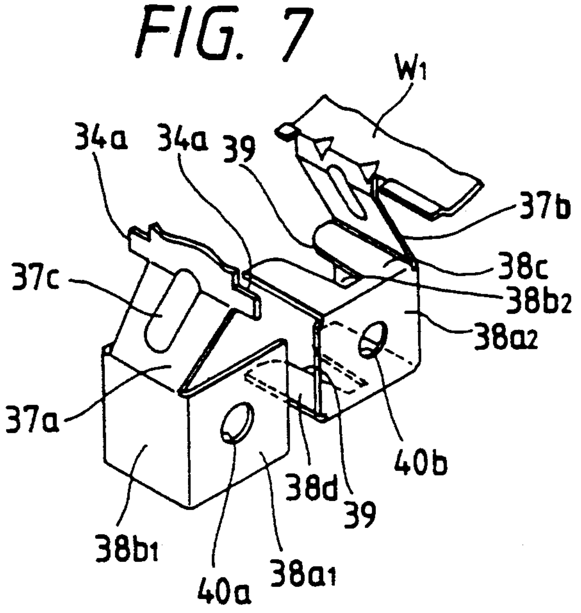
FIG. 7 is a perspective view of the connecting member of the shade, showing the manner of folding or shaping of the connecting member.
Figure 8:
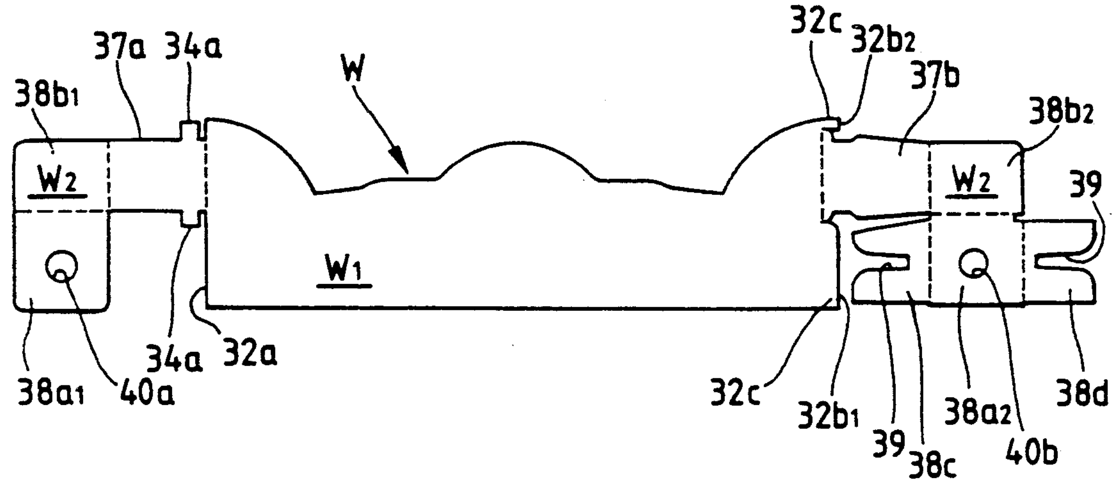
FIG. 8 is a plane view of a thin metal plate to be bent or shaped into the shade, and is a developed view of the shade.
Figure 9A:
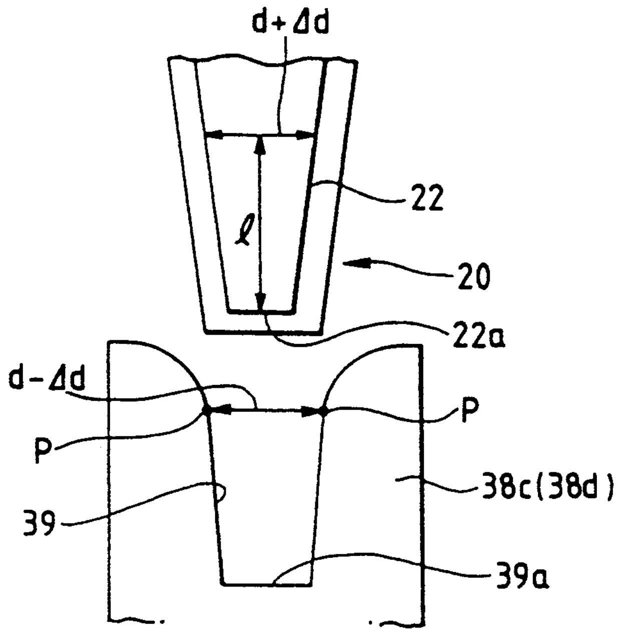
FIGS. 9A and 9B are views showing the shape of the shade and the shape of a boss (shade-mounting portion of a reflector)
Figure 9B:
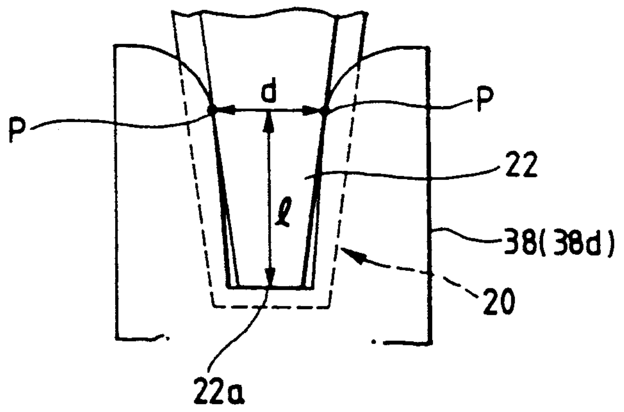

FIG. 4 is a perspective view of a vehicular headlamp incorporating a beam-forming shade, with a lens removed, FIG. 5 is an enlarged perspective view of the beam-forming shade, FIGS. 3A and 3B are views explanatory of a comparison between features of shade body-supporting portions of connecting members, and FIG. 6 is a perspective view as seen from the lower side, showing a portion of division between the shade body and the connecting member. FIG. 7 is a view showing the manner of folding or shaping of the connecting member, FIG. 8 is an developed view of the shade, and FIGS. 9A and 9B are views showing the shape of the shade and the shape of a boss (shade-mounting portion) of a reflector.

Referring to these Figures, a lamp body 10 of the headlamp has a rectangular container shape, and has an opening at its front face for mounting an outer lens (not shown). A reflector 12 subjected to an aluminized treatment or the like is formed on an inner peripheral surface of the lamp body 10. The reflector 12 has a main reflection surface 12A in the form of a paraboloid, horizontal auxiliary reflection surfaces 12B and 12C formed respectively on inner surfaces of upper and lower wall 13 and 14 of the lamp body, and a frame portion 15 formed at the front end portions of the reflection surfaces 12A to 12C and having a seal groove 16 at its outer peripheral portion. The auxiliary reflection surfaces 12B and 12C do not contribute much to the distribution of the light beam. A boss 20 is provided on an inner surface of a rear wall 11 so as to project forwardly therefrom. The boss 20 is positioned at a central portion of a right-and-left direction of the frame portion 15. A beam-forming shade 30 is connected to the boss 20 of the reflector 12 by a single screw. Ribs 22 are formed respectively on upper and lower portions on the peripheral surface of the boss 20, and extend in a forward-and-rearward direction (i.e., in the projecting direction of the boss). The ribs 22 perform as a positioning member for accurately determining a mounting position of the shade 30 with respect to the reflector 12, as will hereinafter be more fully described.

The shade 30 is provided with a cylindrical shade body 32 arranged in surrounding relation to a bulb 18 so as to appropriately interrupt part of light emitted from a filament 19, and a single connecting member 35 having a rectangular frame shape formed on and projecting downwardly from the shade body 32 to support the shade body 32. The shade 30 is fixed to the reflector 12 by a screw through the connecting member 35. The shade 30 is formed by bending a metal thin plate W (see FIG. 8) having a predetermined shape cut from a blank. The shade 30 is subjected to a sintering treatment after it is bent. The thin plate W which is an elongated plate generally symmetrical right and left has a shade body-forming region $W_1$ which is a developed form of the cylindrical shade body 32, and connecting member-forming regions $W_2$ provided respectively at the opposite ends of the region $W_1$, which regions $W_2$ are a developed form of the connecting member 35. The thin plate W can efficiently be obtained by cutting a metal sheet material or a roll material of a predetermined size into a shade-forming size, and by doing so, a high yield of the material is achieved.

One cylindrical open end edge 33 of the shade body 32 has a shape corresponding to a parting line $12A_1$ of the main reflection surface 12A of the reflector 12, so as to interrupt the light beam directed from the filament 19 to the reflector 12 except for the main reflection surface 12A of the reflector. That is, the light beam directed toward the auxiliary reflection surfaces 12B and 12C deteriorates a required light distribution pattern and, therefore, these light beams should be interrupted so as to form efficiently a proper light distribution pattern only by the use of the main reflection surface 12A.

Although the shade body 32 is formed into a cylindrical shape by butting opposite longitudinal end edge portions 32*a* and 32*b* ($32b_2$ and $32b_2$) of the shade body-forming region $W_1$ to each other, a step portion 32*c* offset an amount corresponding to the plate thickness is formed on one end edge portion 32*b*, so that the step portion is disposed in overlapping relation as shown in FIGS. 5 and 6. The overlapped portions are provided respectively on both sides of the portion of division from the connecting member 35 in such a manner that this division portion is interposed between the overlapped portions. With this arrangement, an excellent mechanical strength is achieved. The end edge portion 32*b* ($32b_1$ and $32b_2$) constituting the overlapped portions extends to the base of the portion of division from the connecting member 35 so as not to form any gap in the mated portion. With this arrangement, no leakage of the light from the portion of division from the connecting member 35 occurs. If necessary, the overlapped portions may be welded together in order to achieve more mechanical strength and more light leakage preventing performance.

Reference numeral 34 denotes press-deforming portions which is formed by bending press-deforming portions 34*a* formed on a strip portion 37*a* of one of the connecting member-forming regions $W_2$ extending from the shade body-forming region $W_1$, so that the shade body 32 is maintained in a cylindrical shape. Bead portions 35*c* are formed at the portion of division between the shade body 32 and the connecting member 35 to increase the rigidity and strength.

As shown in FIG. 5, the connecting member 35 has a shade supporting member 36 of a triangular construction and a mounting portion 38 have a square frame-shape. The supporting member 36 of the connecting member 35 is formed by arranging the strip portions 37*a* and 37*b* of the connecting member-forming regions $W_2$ in a triangular shape on the mounting portion 38. Therefore, this construction is superior in rigidity and strength compared to a square-shaped construction (FIG. 3A) in which a pair of strip portions $37a_1$, are disposed parallel to each other, and also to an overlapped construction (FIG. 3B) in which strip portions $37a_2$ overlap each other.

Bead portions 37*c* are formed respectively on the portions 37*a* and 37*b* constituting the supporting member 36. The bead portions 37*c* extend longitudinally from the butted portion, thereby increasing the rigidity of the supporting member 36. The mounting portion 38 is a shaped construction in the form of a square frame opening to a rear side and, as shown in FIG. 7, provided with front face-forming portions $38a_1$ and $38a_2$, side face-forming portions $38b_1$ and $38b_2$, an upper face-forming portion 38*c* and a lower face-forming portion 38*d* which are bent right-angularly, and the front face-forming portions $38a_1$ and $38a_2$ are disposed in overlapped relation to each other.

A notch 39 opening to the rear side is formed in each of the upper wall (upper face-forming portion) 38*c* and the lower wall (lower face-forming portion) 38*d*, and the ribs 22 formed respectively on the upper and lower portions of the boss 20 projecting from the reflector 12 are fitted respectively in the notches 39 so as to accurately position the shade 30.

Figure 9C:
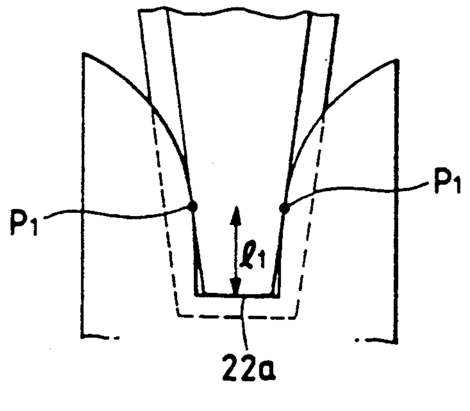
FIG. 9C is a view showing a comparative example of shade-mounting portion.

As shown in FIGS. 9A and 9B, the boss 20 and the ribs 22 are tapered progressively toward their distal ends, and the width of that portion of the rib 22 spaced a distance l ($l>d$) from the distal end 22*a* of the rib 22 is $\Delta d+d$. On the other hand, the width of that portion of the notch 39 spaced a distance l ($l>d$) from a closed end 39*a* of the notch 39 is $d-\Delta d$. Therefore, the side faces of the rib 22 are brought into pressure contact with the peripheral edge of the notch 39 at a point P spaced a certain distance from the distal end of the rib. If as shown in FIG. 9C, the points of pressure contact between the side faces of the rib and the peripheral edge of the notch are spaced a relatively short distance $l_1$ ($l_1<l$) from the distal end 22*a* of the rib, rattling may be liable to occur in response to vibrations; however, with the construction of this embodiment, rattling is hardly produced in response to vibrations, thus providing the shade mounting construction which hardly allows a change in the position of mounting of the shade relative to the reflector 12.

A screw insertion hole 40 is formed through the front wall 38 (front face-forming portions $38a_1$ and $38a_2$) of the reflector-mounting portion 38, so that the reflector-mounting portion 38 can be fixed to the boss 20 by inserting a screw 42 into the screw insertion hole 40 and threading the screw into a screw hole 24 in the boss 20. Hence, the shade 30 is integrally attached to the reflector 12.

The front wall 38*a* of the reflector-mounting portion 38 is of an overlap construction formed by the first front wall (front face-forming portion) $38a_1$ and the second front wall (front face-forming portion) $38a_2$. A screw insertion hole 40*a* through the first front wall $38a_1$ is slightly greater in outer diameter than the screw 42, and a screw insertion hole 40*b* through the second front wall $38a_2$ is equal in outer diameter to the screw 42. Such a structure is advantageous in occurring no considerable positioning error or displacement between the first front wall 38*a*1 and the second front wall $38a_2$ at the time of the shaping operation. Thus, the shade 30 can easily detachably and rapidly be attached to the reflector 12 by the single screw 42.

FIGS. 10 to 13 show a second embodiment according to the present invention.

Figure 10:
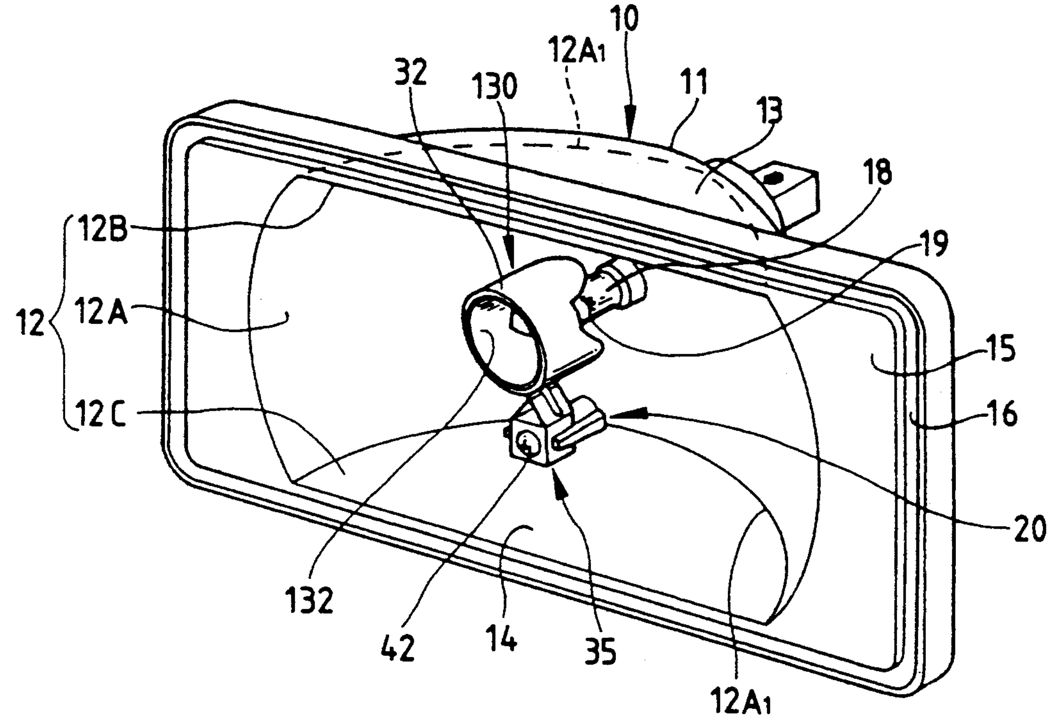
FIG. 10 is a perspective view of a headlamp incorporating a second embodiment of a shade of the present invention, with a lens removed.
Figure 11:
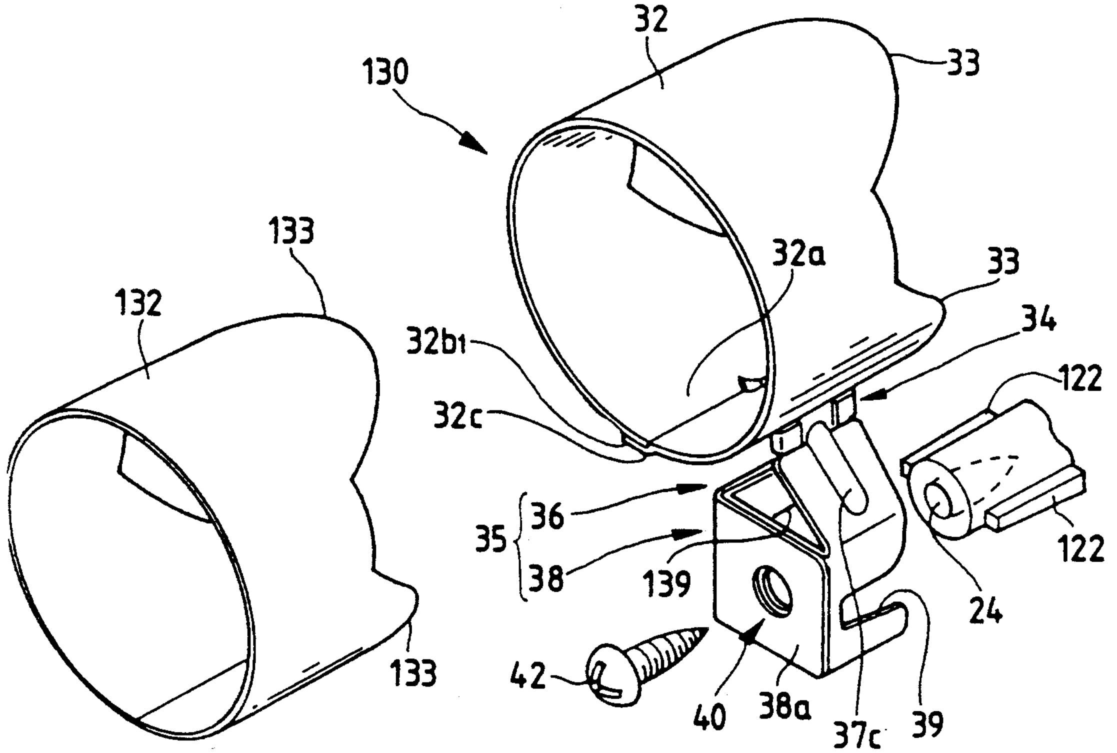
FIG. 11 is a perspective view of the shade shown in FIG. 10.

FIG. 10 is a perspective view of a vehicular headlamp incorporating a beam-forming shade, with a lens removed, and FIG. 11 is an enlarged perspective view of the beam-forming shade.

In FIGS. 10 to 13, the same parts and members as that of the first embodiment are designated by the same reference numerals since the member and structure thereof are substantially common between the first and second embodiment. Therefore, the description with respect to the second embodiment will be referred merely to portions which is different from the first embodiment.

Figure 13A:
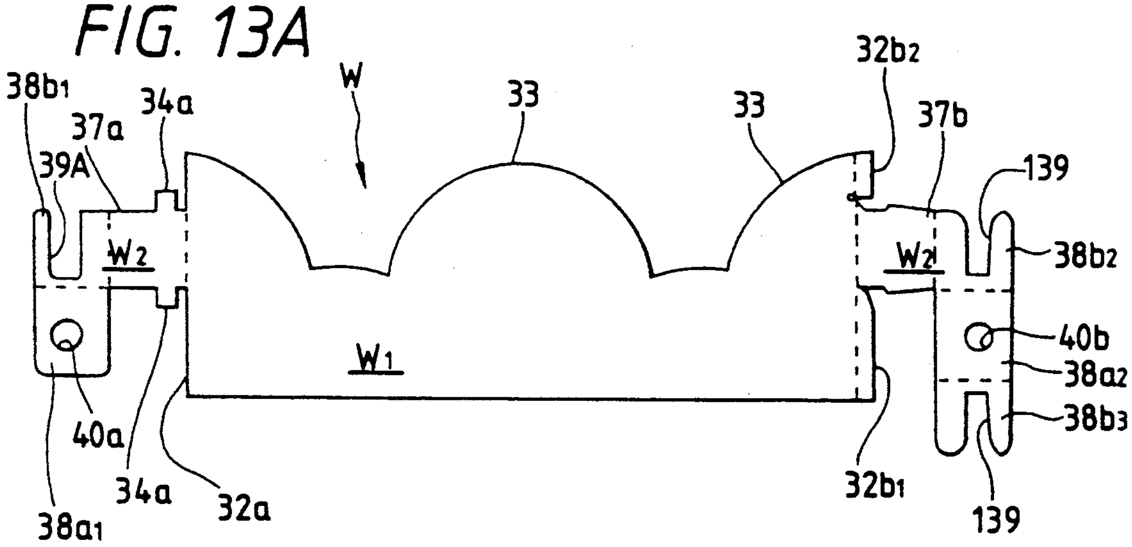
FIG. 13A is a plane view of a thin metal plate to be bent or shaped into the shade, and is a developed view of the shade.
Figure 13B:
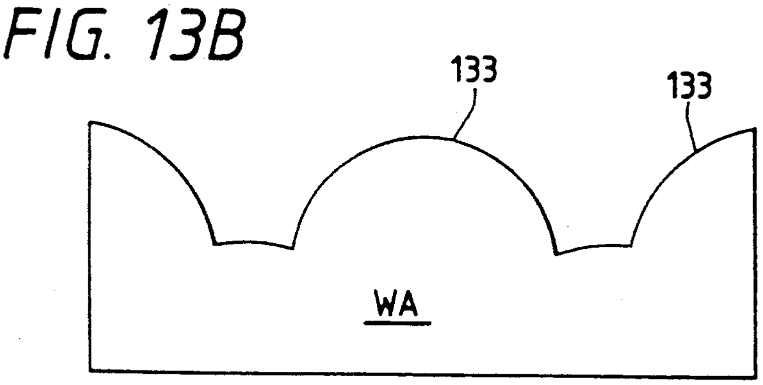
FIG. 13B is a plane view of a thin metal plate to be bent or shaped into the lining of the second embodiment of the present invention.

According to the second embodiment, a cylindrical lining 132 is fixedly and integrally mounted in the shade body 32. The lining 132 having cylindrical open end edge 133 is formed of a metal material such as ferrous material, or the like, and previously cut to shape WA substantially the same as that of the shade body 32 as shown in FIGS. 13A and 13B. The lining 132 is bent to be a cylindrical shape and both ends of which are welded or press-formed. Before fixedly mounted in the shade body 32, the lining 132 is subjected to a sintering treatment after being bent to thereby reduce reflected light beam from an inner surface of the lining 132. According to the second embodiment, the shade 32 formed of aluminum or SUS material is not subjected to a sintering treatment and, therefore, the surface of the shade is lustrous.

Figure 12:
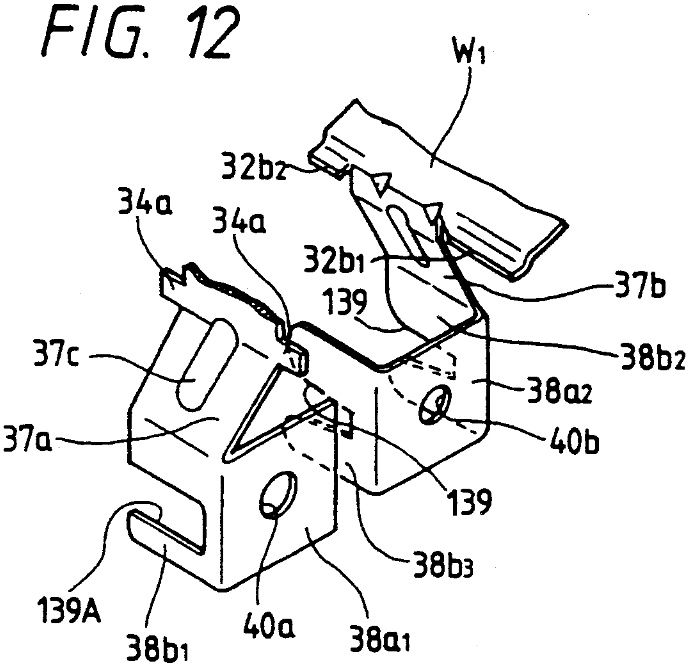
FIG. 12 is a perspective view of the connecting member of the shade according to the second embodiment, showing the manner of folding or shaping of the connecting member.

As shown in FIG. 12, a notch 139 opening to the rear side is formed in each of the right wall (right side face-forming portions) $38b_2$ and the left wall (left face-forming portion) $38b_3$. Further, a notch 139A is formed in the side wall $38b_1$. Ribs 122 formed respectively on the left and right portions of the boss 20 projecting from the reflector 12 are fitted respectively in the notches 139 (139A) so as to accurately position the shade 130.

Figure 1:
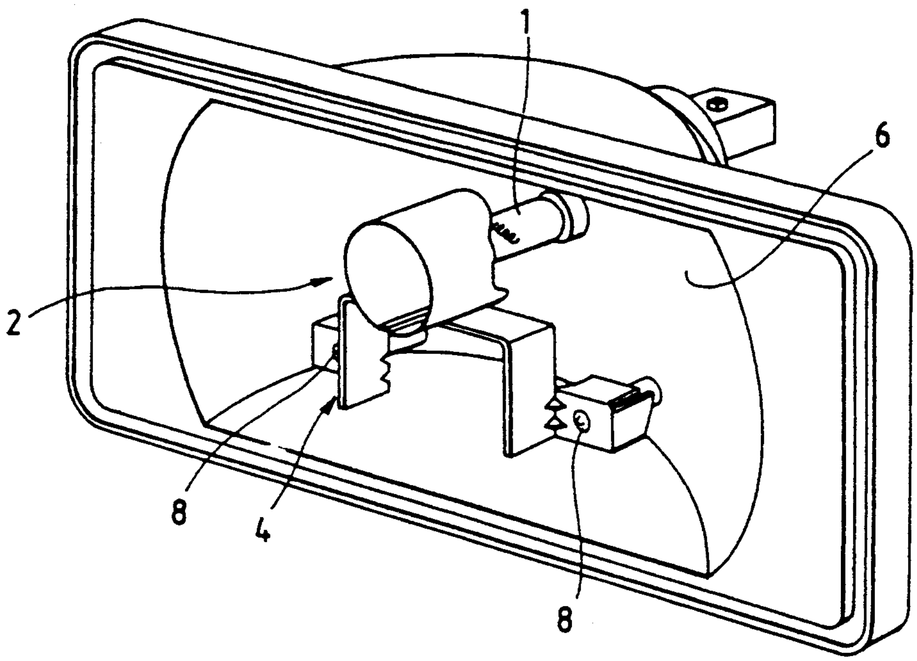
FIG. 1 PRIOR ART
FIG. 1 is a perspective view of a headlamp incorporating a conventional shade.
Figure 2A:
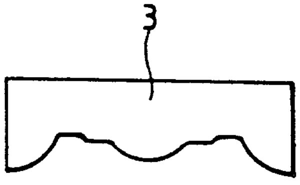
FIG. 2A PRIOR ART
FIGS. 2A and 2B are respectively developed views of a shade body and a connecting member which cooperate with each other to provide the conventional shade.
Figure 2B:
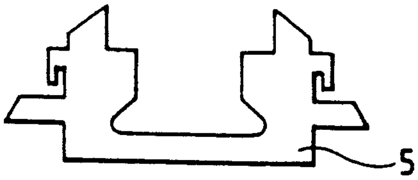
FIG. 2B PRIOR ART

As shown in FIG. 1, the frame-shaped connecting member of the conventional shade has a gate-shaped frame and a pair of mounting portions formed on the outer surface of the frame, and the percentage of the area occupied by the frame-shaped connecting member relative to the reflector 12 is considerably high, so that the reflection light reflected by the reflector is interrupted by the connecting member to some extent thereby deteriorating the light beam distribution. However, the connecting member 35 of the present invention has a square frame shape and is very small compared to the conventional member, and the percentage of interruption of the reflected light (from the reflector) by the shade is low. Therefore, the light beam can be utilized effectively.

Further, since the connecting member 35 is small, the overall construction of the shade 30 is compact and lightweight.

As is clear from the foregoing description, the beam-forming shade for a vehicular headlamp, provided in accordance with the present invention, has the following advantages:

(1) The shade of the present invention is formed by cutting a thin metal plate into a predetermined shape and bending the same. Therefore, the shade does not suffer from the various problems accompanying the conventional shade such as a reduced durability due to residual strains caused by the welding portion between the shade body and the connecting member.

(2) Only the bending operation is required for the manufacture, time required for assembling the shade is reduced and, therefore, the manufacturing cost is low. Also, since no welding operation is applied to a portion between the shade body and the connecting member, the percentage of defective products is low, thus improving the yield.

(3) Since the shade of the invention is fixed to the reflector by a single screw, the operation of fixing the shade to the reflector can be performed easily and rapidly.

(4) The shade is provided with merely one connecting member and, accordingly, the shade according to the present invention would not obstruct light beam emitted from the light source thereby achieving an effective light beam distribution.

What is claimed is:

1. A beam-forming shade for a vehicular headlamp, comprising:

a cylindrical shade body disposed horizontally in surrounding relation to a bulb of the vehicular headlamp; and means for connecting said shade body to the headlamp, said connecting means having a single hole for inserting a screw, wherein said cylindrical shade body and said connecting means are integrally formed from a single thin metal plate of a predetermined shape, said connecting means being formed by at least partially overlapped end portions of said single thin metal plate, said overlapped end portions each having a hole therein, said holes being aligned with one another to define said single hole for inserting a screw.

2. The beam-forming shade according to claim 1, wherein said connecting means extends downwardly from said shade body.

3. The beam-forming shade according to claim 1, wherein said connecting means comprises a rectangular frame having at least three surfaces and a triangular shade body supporting member having a pair of strip portions.

4. The beam-forming shade according to claim 3, wherein said connecting means comprises means for positioning said shade body accurately with respect to the vehicular headlamp.

5. The beam-forming shade according to claim 4, wherein said positioning means comprises a pair of grooves on a top and bottom surfaces of said rectangular frame for fitting to a pair of projections protruded from an inner surface of the vehicular headlamp.

6. The beam-forming shade according to claim 4, wherein said positioning means comprises a pair of grooves on a left and right surfaces of said rectangular frame for fitting to a pair of projections protruded from an inner surface of the vehicular headlamp.

7. The beam-forming shade according to claim 3, wherein said connecting means comprises at least one first bead member on said strip portion of said shade body supporting member.

8. The beam-forming shade according to claim 3, wherein said connecting means comprises at least one second bead portions formed at the portions of division between said shade body and said connecting means.

9. The beam-forming shade according to claim 1, further comprising a cylindrical lining mounted inside said cylindrical shade body, said lining being substantially the same shape as said shade body.

10. The beam-forming shade according to claim 1, wherein said metal plate is formed of ferrous material which is subjected to a sintering treatment.

11. The beam-forming shade according to claim 9, wherein said thin metal plate is formed of aluminum, and said lining is formed of ferrous material which is subjected to a sintering treatment.

12. The beam-forming shade according to claim 1, wherein said cylindrical shade body comprises an overlapped portion constituting no gap.

13. The beam-forming shade according to claim 12, wherein said overlapped portion of said shade body is welded.

* * * * *